US011495839B2

(12) United States Patent  
Beuning et al.

(10) Patent No.: US 11,495,839 B2  
(45) Date of Patent: Nov. 8, 2022

(54) INTERNAL BATTERY HEATING

(71) Applicant: Textron Innovations, Inc., Providence, RI (US)

(72) Inventors: Charles Bernard Beuning, Wichita, KS (US); Vernon Weng-Yew Chang, Wichita, KS (US); Robby Dale Starr, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 358 days.

(21) Appl. No.: 16/162,849

(22) Filed: Oct. 17, 2018

(65) Prior Publication Data

US 2019/0115632 A1    Apr. 18, 2019

Related U.S. Application Data

(60) Provisional application No. 62/573,904, filed on Oct. 18, 2017.

(51) Int. Cl.
*H01M 10/615* (2014.01)
*H01M 10/48* (2006.01)
(Continued)

(52) U.S. Cl.
CPC ....... *H01M 10/443* (2013.01); *H01M 10/441* (2013.01); *H01M 10/482* (2013.01);
(Continued)

(58) Field of Classification Search
CPC ............. H01M 10/443; H01M 10/615; H01M 10/657; H01M 10/441; H01M 10/482; H01M 10/486; H02M 3/1582
See application file for complete search history.

(56) References Cited

U.S. PATENT DOCUMENTS 4,379,816 A * 4/1983 Mullersman ........ H01M 50/213  
429/91  
6,259,229 B1 7/2001 Ashtiani et al.  
(Continued)

FOREIGN PATENT DOCUMENTS

CN 202455140 U * 9/2012  
DE 102014214313 A1 * 1/2016 .......... H01M 10/657

OTHER PUBLICATIONS

EPO machine generated English translation of CN-202455140-U (Year: 2012).*

(Continued)

*Primary Examiner* — Christopher P Domone  
*Assistant Examiner* — Kimberly Wyluda  
(74) *Attorney, Agent, or Firm* — Avek IP, LLC (57) ABSTRACT

An internal battery heating system includes an electrical conversion device electrically coupled to an electrochemical sub-cell or battery modules to form a heating circuit. The electrical conversion device alternately raises and lowers a voltage of the heating circuit to drive current between the heating circuit and the electrochemical sub-cell or battery modules. A controller commands the electrical conversion device to cyclically charge and discharge the electrochemical sub-cell or battery modules for internally heating the battery modules. Alternatively, a battery module may be electrically coupled to electrochemical sub-cells via pairs of switches to form a heating circuit. The pairs of switches are adapted for switching the heating circuit alternately between a parallel arrangement and a series arrangement to alternate charging and discharging of the battery module which results in internal heating of the battery module.

20 Claims, 7 Drawing Sheets

(51) Int. Cl.
- *H01M 10/44* (2006.01)
- *H01M 10/657* (2014.01)
- *H02M 3/158* (2006.01)

(52) U.S. Cl.
CPC ....... *H01M 10/486* (2013.01); *H01M 10/615* (2015.04); *H01M 10/657* (2015.04); *H02M 3/1582* (2013.01)

(56) References Cited

U.S. PATENT DOCUMENTS

| | | | |
|---|---|---|---|
| 8,452,490 B2 | 5/2013 | Lakirovich et al. | |
| 9,214,706 B2 | 12/2015 | Xu et al. | |
| 9,831,534 B2 | 11/2017 | Beuning et al. | |
| 10,069,176 B2 | 9/2018 | Beuning et al. | |
| 2012/0169126 A1* | 7/2012 | Totterman | H02M 3/1582 307/66 |
| 2012/0249284 A1* | 10/2012 | Almquist | H01M 10/63 340/3.1 |
| 2014/0272649 A1* | 9/2014 | Hashim | H01M 8/04268 429/429 |
| 2014/0285135 A1 | 9/2014 | Ji et al. | |
| 2015/0108114 A1* | 4/2015 | Beuning | H01M 10/443 219/492 |
| 2017/0155255 A1* | 6/2017 | Ono | H02J 7/0029 |

OTHER PUBLICATIONS

EPO machine generated English translation of DE-10-2014214313-A1 (Year: 2016).*

Buck-boost converter (Wikipedia) (Year: 2017).*

* cited by examiner

INTERNAL BATTERY HEATING

CROSS-REFERENCE TO RELATED APPLICATIONS

This application claims the benefit of U.S. Provisional Patent Application Ser. No. 62/573,904 entitled Internal Battery Heating and filed Oct. 18, 2017, the disclosure of which is herein incorporated by reference in its entirety.

BACKGROUND

When batteries are exposed to cold temperatures, their electrolytes are susceptible to freezing. A frozen electrolyte solution has a high viscosity and a high internal resistance, which resists the flow of electrons and chemical ions between positive and negative electrodes, reducing battery function. A battery may be warmed to restore function.

1. Field

Embodiments of this disclosure relate generally to the field of battery heating systems, and more specifically to internal battery heating systems.

2. Description of the Related Art

Many different battery heating systems are described in the prior art. The prior art systems are typically configured with a heating element coupled to the battery to be heated. For example, U.S. Pat. Nos. 9,831,534 and 10,069,176, both to Beuning et al., disclose systems and methods for heating a battery using a separate heating element. Both of these patents are incorporated herein by reference in their entirety.

Other prior art battery heating systems include U.S. Pat. No. 6,259,229 to Ashtiani et al., which discloses a circuit with a variable frequency half-bridge configuration that heats a string of Li-Ion batteries. U.S. Pat. No. 8,452,490 to Lakirovich et al. discloses an electronic circuit that includes a plurality of switch and diode pairs in a stacked configuration connected to an inductor and two batteries. U.S. Pat. No. 9,214,706 to Xu et al. discloses a battery heating circuit with two batteries each connected in series to a two-way switch and a shared charge storage component. U.S. Patent Publication 2014/0285135 to Ji et al. discloses a solid-state heating method whereby electricity is shuttled back and forth between cells of a battery.

SUMMARY

In an embodiment, an internal battery heating system is provided. The system includes a heating circuit electrically coupled with a core battery. The heating circuit includes an electrical conversion device for alternately raising and lowering a voltage of the heating circuit, and an electrochemical sub-cell for alternately discharging from, and charging to, the core battery. A controller is adapted to command the electrical conversion device for alternately raising and lowering the voltage of the heating circuit to charge and discharge the core battery, thereby internally heating the core battery.

In another embodiment, an internal battery heating system includes a core battery electrically coupled to a heating circuit. The heating circuit includes a plurality of electrochemical sub-cells each electrically coupled to the heating circuit via a pair of switches, such that the plurality of electrochemical sub-cells may alternate between a parallel arrangement and a series arrangement. A controller is adapted to provide coordinated switching of the pair of switches for each of the plurality of electrochemical sub-cells for alternating between the parallel arrangement and the series arrangement, such that in the parallel arrangement, the core battery discharges to the plurality of electrochemical sub-cells, and in the series arrangement, the core battery charges from the plurality of electrochemical sub-cells, thereby internally heating the core battery.

In yet another embodiment, an internal battery heating system includes a heating circuit comprising an electrical conversion device switchably connected to a first battery module via a first switch, a plurality of additional battery modules electrically coupled with the heating circuit in a parallel configuration, and a controller adapted to instruct the electrical conversion device to alternately raise and lower a voltage from the first battery module for alternately charging and discharging the plurality of additional battery modules.

In another embodiment, an internal battery heating system includes a first battery module, a second battery module, a third battery module, and a fourth battery module, each electrically coupled to a controller. The system further includes a first switch, a second switch, a third switch, and a fourth switch electrically coupled to the first battery module, the second battery module, the third battery module, and the fourth battery module, respectively, for switching electrical coupling of each battery between a heating circuit and a power terminal. An electrical conversion device is electrically coupled to the fourth battery module for alternately raising and lowering the voltage of the heating circuit, and a controller is configured to control the electrical conversion device, the first switch, the second switch, the third switch, and the fourth switch, such that the first battery module, the second battery module, and the third battery module are independently heated or independently coupled to the electrical power terminal for providing electrical power.

BRIEF DESCRIPTION OF THE SEVERAL VIEWS OF THE DRAWINGS

Illustrative embodiments of the present disclosure are described in detail below with reference to the attached drawing figures, which are incorporated by reference herein and wherein.

DETAILED DESCRIPTION

Battery heating may be performed with a separate heating element that is powered either by the battery itself or by an external power source. Powering a heater with the battery itself assumes that the battery can provide enough current to operate the heater, but under extremely cold conditions this may not be the case. Alternatively, the heater is powered using an external electrical power source, assuming that one is available and that personnel are available to operate the external electrical power source. For an aircraft, a typical external power source is a ground power cart, but these are not commonly available at many small airports and in remote, cold-temperature locations.

In some known arrangements, a separate heater is powered by a cold battery, with power being incrementally increased until the battery reaches its normal operating temperature. However, a substantial amount of stored electrical energy within the battery may be expended to power the separate heater, and some of the heat emitted by the separate heater is wasted. As a result, much of the state of charge of the battery may be depleted by the time the battery is warmed to its normal operating temperature.

Embodiments of the present disclosure provide a plurality of electrochemical sub-cells or battery modules arranged with switches and, optionally, electrical conversion devices (e.g., a DC-DC converter) to form a heating circuit. In certain embodiments, the plurality of batteries include one or more core batteries arranged in parallel with one or more electrochemical sub-cells (see e.g., FIGS. 1-3 and their description below). A core battery may be any combination of electrochemical cells needed to be warmed to perform an intended function. An electrochemical sub-cell is for example a cell, battery, or capacitor that is typically smaller than the core battery. The one or more sub-cells may be physically separate from the core battery or co-located inside the same enclosure. Alternatively, a portion of a battery, such as a module or a bank of a multi-module/bank battery may be dedicated as a sub-cell of the same battery. For example, a single core battery may consist of a plurality of modules, and one or more modules may be selectively isolated and switched to serve as sub-cells during preheating (see e.g., FIGS. 4-7 and their description below). The one or more sub-cells may be used exclusively for warming or for a secondary use after a minimum operating temperature is reached.

Instead of using a heating element, the one or more electrochemical sub-cells are used to act as a load (e.g., a current sink for discharging) from the core battery, or to act as a supply (e.g., a current source for charging) to the core battery (see e.g., FIGS. 1-7 and their description below). Electron and ion flow in the liquid electrolyte produces heat from friction of the electron and ion movement. The heat reduces electrolyte viscosity which increases electron and ion flow rates. By repeatedly cycling the one or more core batteries between charging and discharging, the heat generated warms the electrolyte until the one or more core batteries or battery modules reach a minimum operating temperature sufficient for performing an intended function.

A trade-off of not using an external power source and load bank to produce cycling between charging and discharging is that some of the energy stored in the core battery is consumed through the charge/discharge of its cells to self-heat the battery. Self-heating is limited by losses from each charge/discharge step (e.g., electrochemical energy converted into heat in the core battery, electrochemical sub-cell, DC-DC converter, or controller); in practice, however, only a portion of the core battery's stored energy is needed for preheating to achieve a minimum operating temperature and voltage.

Figure 1:
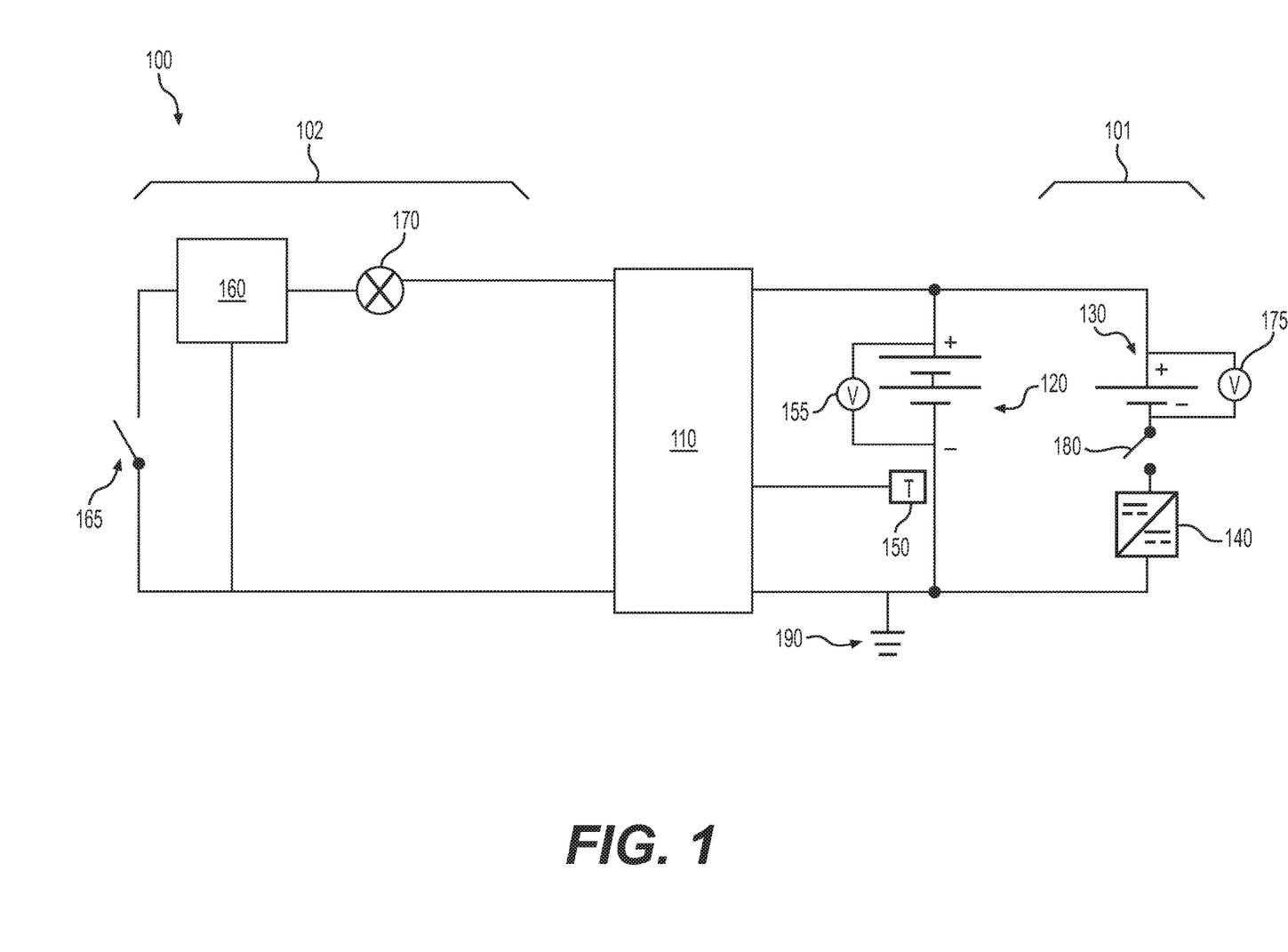
FIG. 1 is a circuit diagram showing an internal battery heating system, in an embodiment.

FIG. 1 is a circuit diagram showing an exemplary internal battery heating system 100. System 100 includes a controller 110 electrically coupled to a core battery 120 arranged in parallel with an electrochemical sub-cell 130 and coupled to a ground 190. A DC-DC converter 140 is electrically coupled in series with sub-cell 130 via a switch 180; a temperature sensor 150 provides a temperature measurement of core battery 120 to controller 110; and, a voltage sensor 155 provides a voltage measurement of core battery 120 to controller 110. An additional voltage sensor 175 may be used to measure voltage of sub-cell 130. In embodiments having more than one battery module (e.g., FIGS. 4-7) or more than one sub-cell (e.g., FIGS. 2 and 3), additional voltage sensors and additional temperature sensors may be included (not shown).

Controller 110 provides control of all components of system 100, including a heating circuit 101 and a timer/indicator circuit 102. Controller 110 may include programmable memory, a processor, and electronics for carrying out automated control of system 100 components, such as an integrated circuit or a printed circuit board including a microcontroller, microprocessor, or programmable logic controller (PLC), for example. Controller 110 may provide over-voltage and current limit protection to prevent damage to the core battery and the sub-cells.

Heating circuit 101 includes switch 180, DC-DC converter 140, and sub-cell 130. When the internal heating function is activated, heating circuit 101 is connected to the core battery 120 via switch 180. DC-DC converter 140, under control of controller 110, is configured to raise/lower the voltage of heating circuit 101 to drive charging/discharging of core battery 120. DC-DC converter 140 is an example of an electrical conversion device, such as an electronic circuit or electromechanical device that converts a source of direct current (DC) from one voltage level to another. An example is a buck-boost converter that combines a buck (step-down) converter with a boost (step-up) converter.

Timer/indicator circuit 102 includes a timer 160, a heater-timer-enable switch 165, and an indicator 170. Timer 160 is electrically coupled with controller 110 for activating internal battery heating system 100 for a duration based on information received from temperature sensor 150 and voltage sensor 155 or based on a predetermined amount of time. Temperature sensor 150 is for example a thermocouple or resistance-temperature-detector (RTD). Heater-timer-enable switch 165 is a user-activated switch (e.g., a physical switch or a networked remote-access switch) that enables a user to activate internal battery heating system 100. Indicator 170 provides an indication when internal battery heating system 100 is active. Indicator 170 may include one or more lights to indicate when the battery is warming or when the battery has reached its minimum operating temperature, for example.

In operation, when a battery is cold-soaked (e.g., −40° C.), heater-timer-enable switch 165 is activated by a user, which activates timer 160 to draw a small current from core battery 120 and activate controller 110 and indicator 170. Controller 110 determines if the temperature of core battery 120 is below a predetermined threshold (e.g., −10° C.) via temperature sensor 150. If so, controller 110 sends a signal to switch 180 commanding it to close heating circuit 101 and the higher voltage of core battery 120 is used to charge sub-cell 130 through the DC-DC converter 140. Controller 110 monitors the voltage of sub-cell 130 and when the voltage reaches a predetermined level (e.g., an over-voltage limit), DC-DC converter 140 is commanded to switch the role of core battery 120 from serving as a source providing electrical current to serving as a load receiving electrical current. Controller 110 commands DC-DC converter 140 to raise the voltage of the heating circuit 101 to drive the current to core battery 120. Controller 110 monitors the voltage of sub-cell 130, and as it approaches a pre-defined cut-off voltage (e.g., an under-voltage limit), the charge/discharge cycle is repeated.

Meanwhile, the temperature of core battery 120 is monitored via temperature sensor 150 and cycling of charging/discharging is repeated until a predetermined minimum temperature (e.g. +10° C.) is reached. Controller 110 may determine a rate of cycling based on various factors, for example predetermined charge/discharge periods, a predetermined minimum voltage of core battery 120, or a duty cycle based on one or more temperature thresholds of core battery 120 (see e.g., U.S. Pat. Nos. 9,831,534 and 10,069,176, to Beuning et al., which are incorporated by reference).

Once the predetermined temperature is exceeded, controller 110 deactivates internal battery heating system 100 and indicator 170 changes its indication. For example, indicator 170 may change color or change from a continuous illumination to an intermittent illumination (e.g., flashing). Core battery may then be connected via switches (not shown) to power terminals (not shown) for providing electrical power.

Following preheating, sub-cell 130 may be isolated via switch 180 to open the heating circuit 101. In certain embodiments, sub-cell 130 may be configured with smaller capacity (e.g., less total Amp-hours (Ah)) than core battery 120 to reduce unnecessary space, weight, and cost for a feature that may be used only occasionally. For example, a 7.2V 40 Ah core battery may be used with a 3.6V 2 Ah sub-cell (if one sub-cell is used). By incorporating DC-DC converter 140, heating circuit 101 may have the same number of sub-cells in series as the number of cells in series in the core battery. The DC-DC converter provides a voltage boost that enables the sub-cells to discharge to the core battery. Over-voltage and current limit protection are used to prevent overcharge of the sub-cells.

Figure 2:
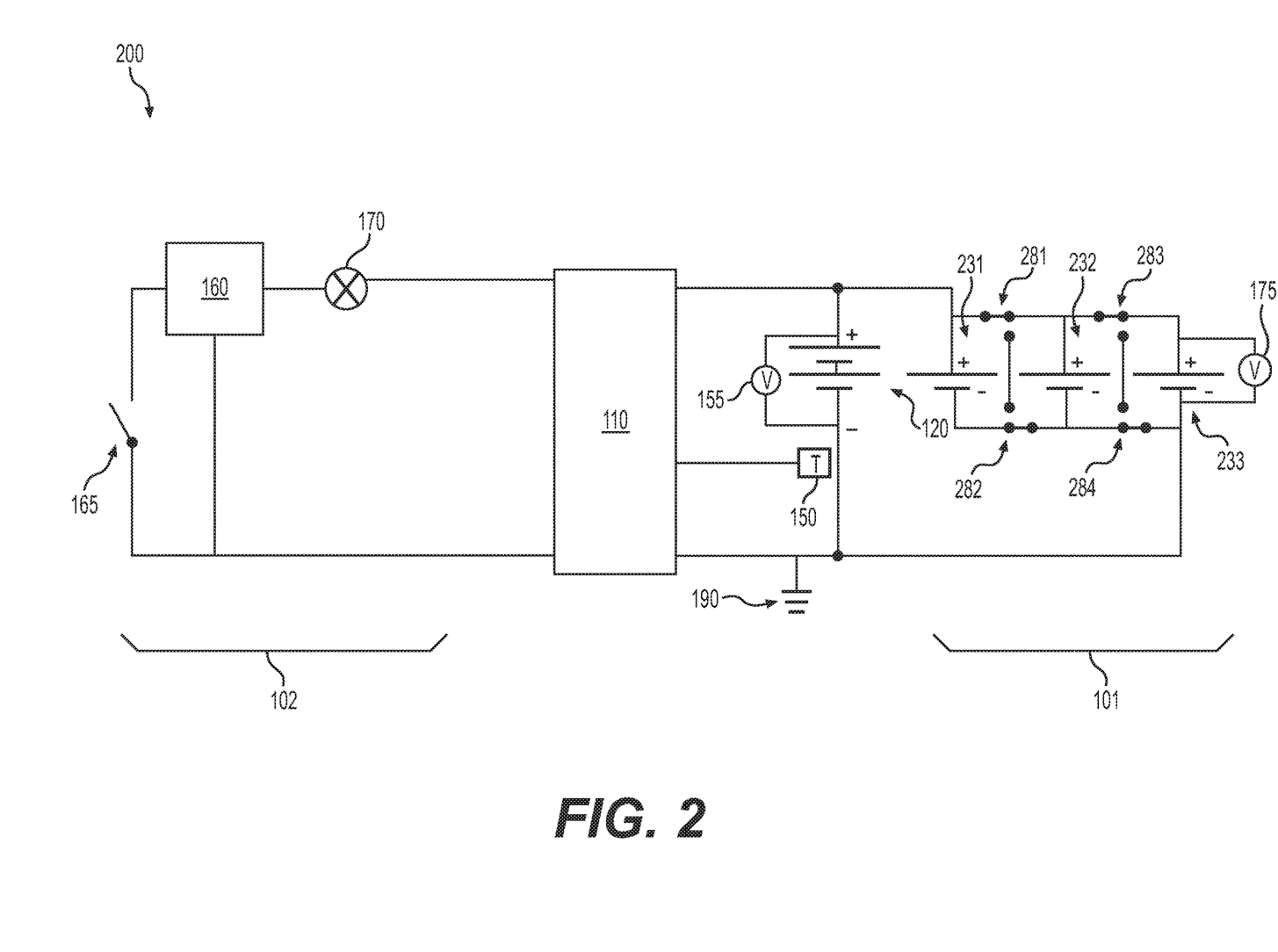
FIG. 2 is a circuit diagram showing another embodiment of an internal battery heating system with sub-cells arranged in parallel.
Figure 3:
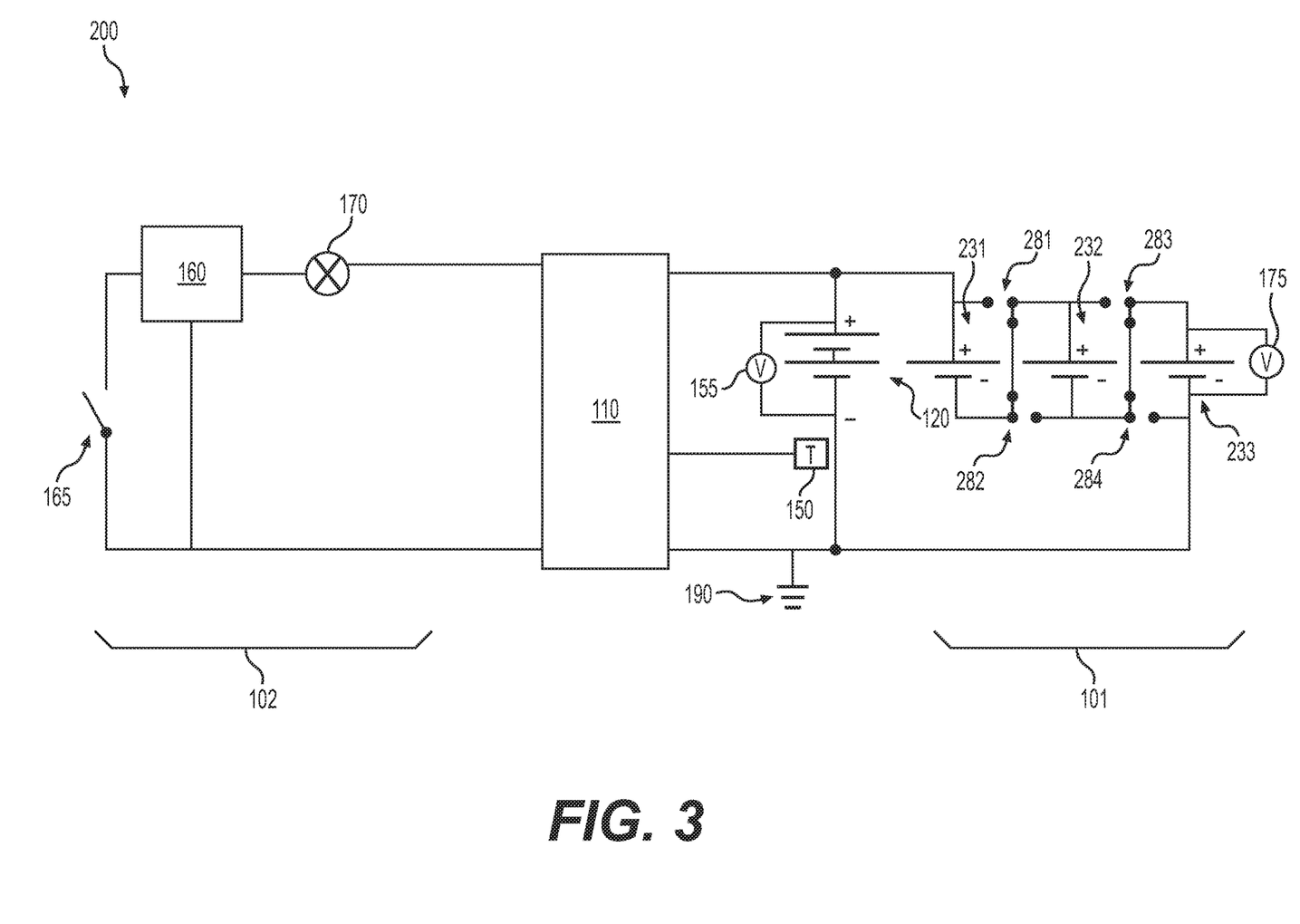
FIG. 3 is a circuit diagram showing the internal battery heating system of FIG. 2 with a sub-cells arranged in series.

FIGS. 2 and 3 provide a circuit diagram showing an exemplary internal battery heating system 200. System 200 includes many of the same features of system 100, FIG. 1; accordingly, their description may not be repeated here. System 200 includes three electrochemical sub-cells, a first sub-cell 231, a second sub-cell 232, and a third sub-cell 233. First, second, and third sub-cells 231, 232, 233 are examples of sub-cell 130, FIG. 1. Instead of having a DC-DC converter as in system 100 for driving charging/discharging cycles, system 200 uses a first switch 281, a second switch 282, a third switch 283, and a fourth switch 284 to arrange first, second, and third sub-cells 231, 232, 232 alternately in parallel (as depicted in FIG. 2) or in series (as depicted in FIG. 3) to drive charging/discharging cycles of core battery 120.

Switches used in different embodiments disclosed herein, including first, second, third, and fourth switches 281, 282, 283, 284, may include combinations of switching devices such as relays, transistors (e.g., field-effect transistors), and diodes, without departing from the scope hereof. The switches may be configured as pairs of switches; for example, first and second switches 281, 282 form a first pair of switches for alternating series and parallel arrangements of first sub-cell 231. Similarly, third and fourth switches 283, 284 form a second pair of switches for alternating series and parallel arrangements of second sub-cell 232.

In operation, control of first, second, third, and fourth switches 281, 282, 283, 284 is coordinated by controller 110 such that one or more of first, second, and third sub-cells 231, 232, 233 may be configured in parallel (as depicted in FIG. 2) to provide a lower nominal voltage than core battery 120 (e.g., for discharging core battery 120), or in series (as depicted in FIG. 3) to provide an equal or higher nominal voltage than core battery 120 (e.g., for charging core battery 120). In certain embodiments, internal battery heating system 200 may include fewer than three or greater than three sub-cells without departing from the scope hereof. When the sub-cells are switched to a series configuration for discharging to core battery 120, the series of sub-cells is configured with at least one more sub-cell than the number of cells in series in the core battery 120 to provide a higher voltage than the core battery 120. For example, in the embodiment depicted in FIG. 3, there are three sub-cells 231, 232, 232 compared to two cells in core battery 120.

In certain embodiments, controller 110 provides coordinated commands to first, second, third, and fourth switches 281, 282, 283, 284 for dynamically cycling the charging/discharging of core battery 120 based on signals received from voltage sensor 155, a voltage sensor 175, and temperature sensor 150.

Figure 4:
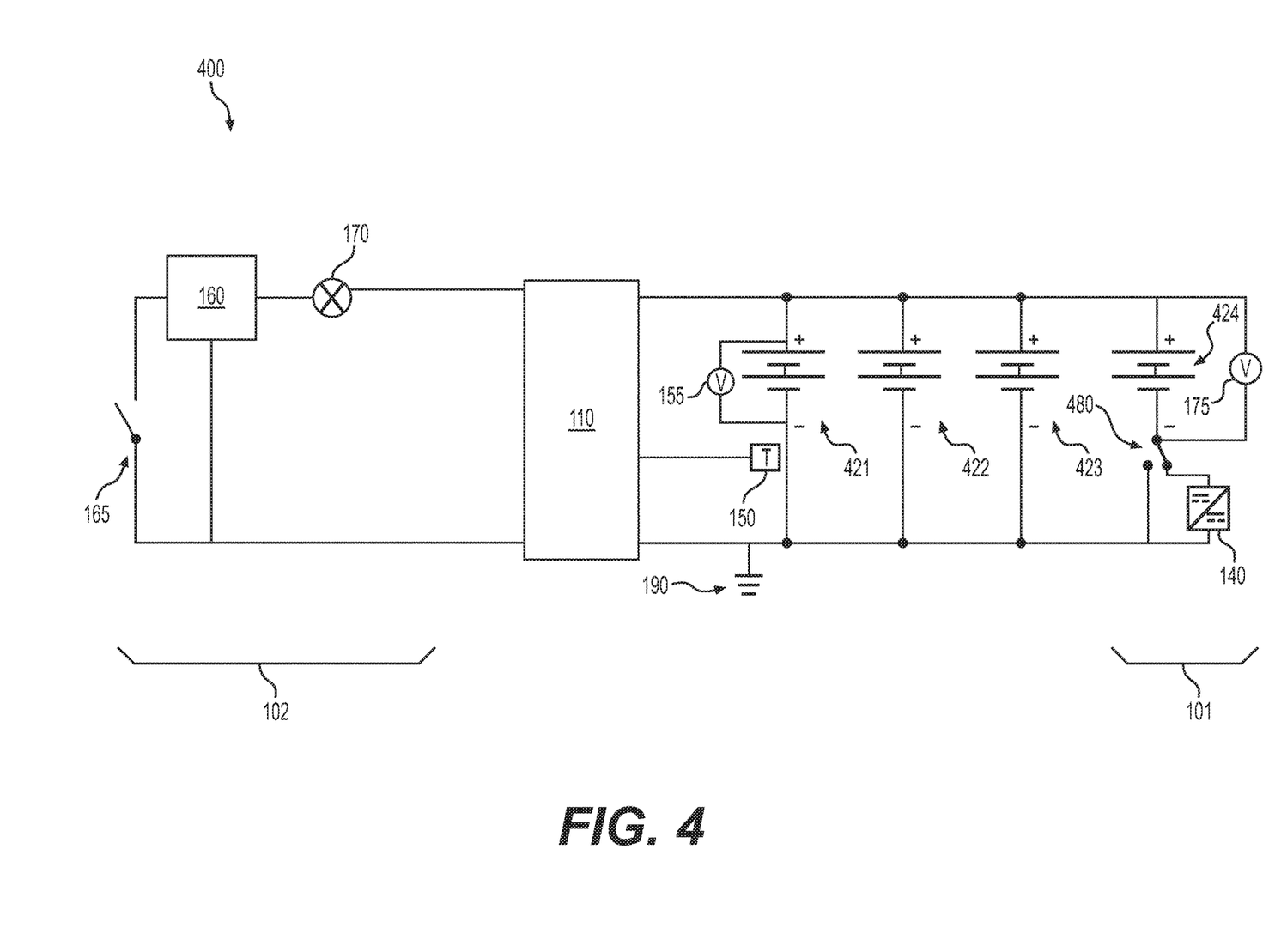
FIG. 4 is a circuit diagram showing another embodiment of an internal battery heating system.

FIG. 4 is a circuit diagram showing an exemplary internal battery heating system 400. System 400 includes a plurality of battery modules arranged in parallel. Specifically, system 400 includes a first battery module 421 and a plurality of additional battery modules, namely a second battery module 422, a third battery module 423, and a fourth battery module 424 arranged in parallel. However, system 400 may include fewer or greater than four modules without departing from the scope hereof. A switch 480 enables coupling of DC-DC converter 140 in series with fourth battery module 424.

In operation, when DC-DC converter 140 is coupled to fourth battery module 424 via switch 480, controller 110 may instruct DC-DC converter 140 to step down voltage from fourth battery module 424, which drives current from the other modules arranged in parallel (e.g., first, second, and third modules 421, 422, 423) thereby charging fourth battery module 424. Conversely, controller 110 may instruct DC-DC converter 140 to boost voltage from fourth module 424, which drives current to first, second, and third modules 421, 422, 423 thereby discharging fourth battery module 424. By cycling the charging and discharging of fourth battery module 424 with that of the additional modules, heat is generated from friction of the electron and ion movement within heating circuit 101. Rates of charging/discharging are determined by controller 110 based on signals received from voltage sensor 155 and temperature sensor 150. When core battery preheating is not required, switch 480 decouples the DC-DC converter from fourth module 424.

In certain embodiments, voltage sensor 175 is electrically coupled to fourth module 424 for determining its voltage, which may be used to compare with the voltage of other modules (e.g., first module 421). When system 400 is actively preheating, first, second, third and fourth modules 421-424 are not used for providing power, and the modules are isolated from the battery's power terminals (e.g., via a switch, not shown).

Figure 5:
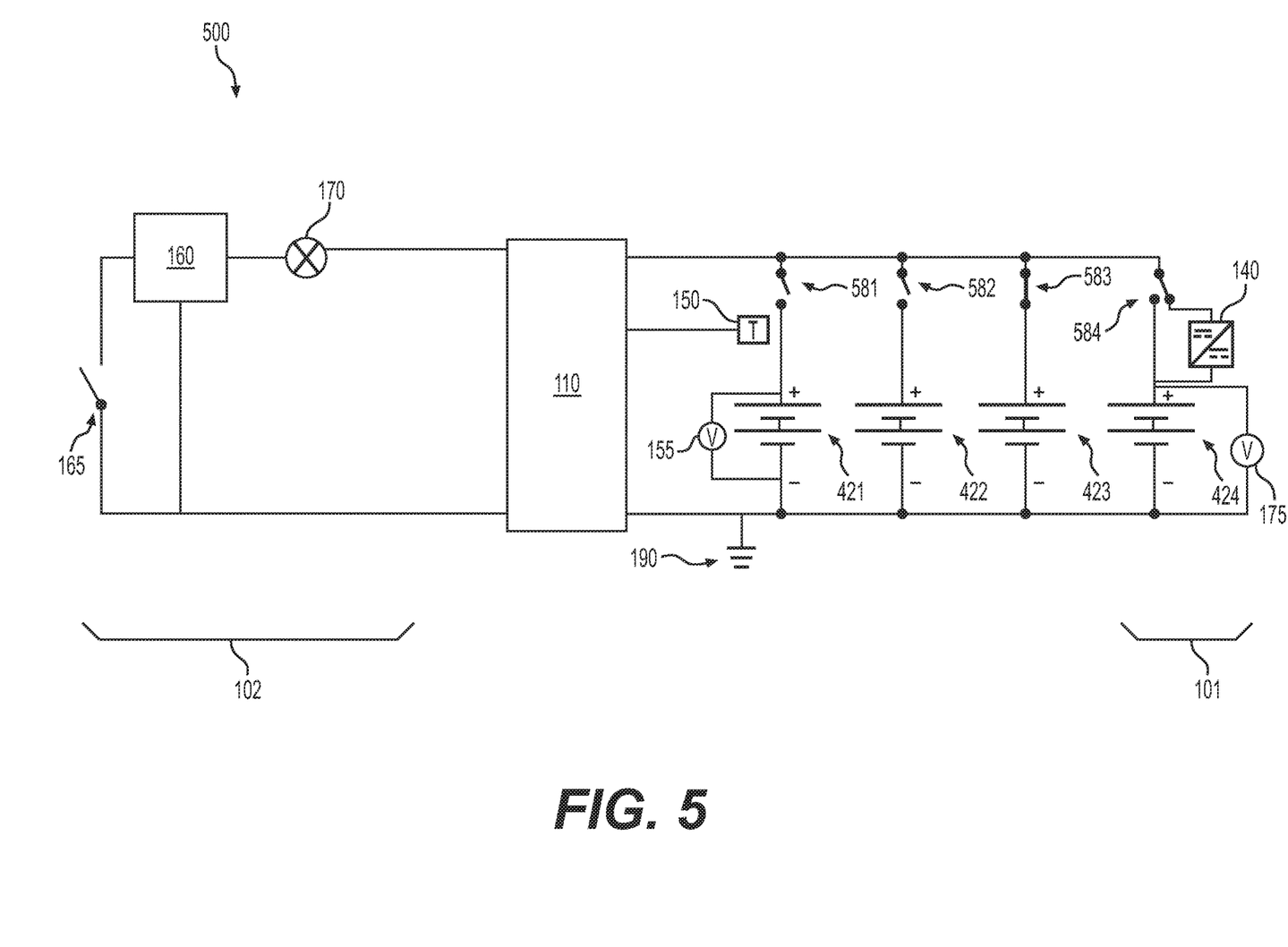
FIG. 5 is a circuit diagram showing another embodiment of an internal battery heating system.

FIG. 5 is a circuit diagram showing an exemplary internal battery heating system 500. System 500 is an example of system 400, FIG. 4 having a switch electrically coupled to each battery module. Specifically, a first switch 581 couples/decouples first battery module 421, a second switch couples/decouples second battery module 422, a third switch 583 couples/decouples third battery module 423, and a fourth switch 584 couples/decouples DC-DC converter 140 to/from fourth battery module 424. As depicted in FIG. 5, third switch 583 is closed such that third and fourth modules 423, 424 are actively heating, while first and second switches 581, 582 are open such that first and second modules 421, 422 are inactive. Fourth switch 584 is configured to couple DC-DC converter 140 to fourth module 424 similar to switch 480, FIG. 4, as described above.

In operation, system 500 cycles charging/discharging between fourth battery module 424 and one or more of first, second, and third modules 581, 582, 583. For example, as depicted in FIG. 5, third module 423 is coupled to fourth module 424 for heating via closed third switch 583, while first and second modules are disconnected from heating circuit 101 by open first and second switches 581, 582. Fourth switch 584 and DC-DC converter 140 drive charging/discharging cycling as described above using switch 480 and system 400, FIG. 4. When system 500 is actively preheating, first, second, third and fourth modules 421-424 are not used for providing power, and the modules are isolated from the battery's power terminals (e.g., via a switch, not shown).

Figure 6:
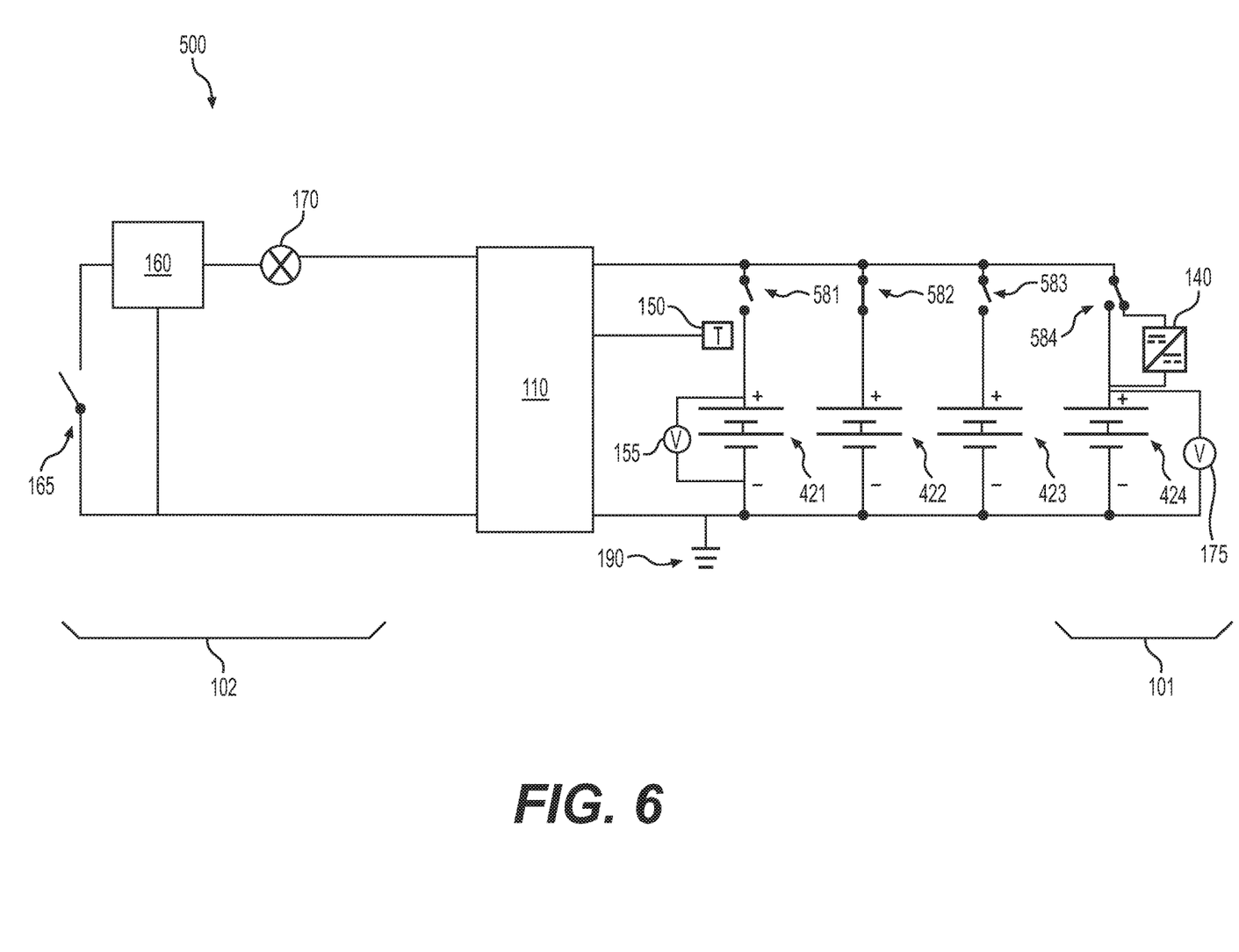
FIG. 6 is a circuit diagram showing the internal battery heating system of FIG. 5 with a first switch open, a second switch closed, and a third switch open.

FIG. 6 is a circuit diagram showing internal battery heating system 500, FIG. 5 with second switch 582 closed and first and third switches 581, 583 open. As depicted in FIG. 6, second and fourth battery modules 422, 424 are actively heating, while first and third modules 421, 423 are inactive. The configuration of system 500 enables selectively shuttling energy back and forth between two or more modules at a time. In addition to voltage sensors 155 and 175 on first and fourth modules 581, 584, respectively, second and third modules 582, 583 may also be configured with a voltage sensor (not shown). Additional temperature sensors (not shown) may be used in addition to temperature sensor 150 and the shuttling of energy may be based partially on the additional voltages and temperatures.

Figure 7:
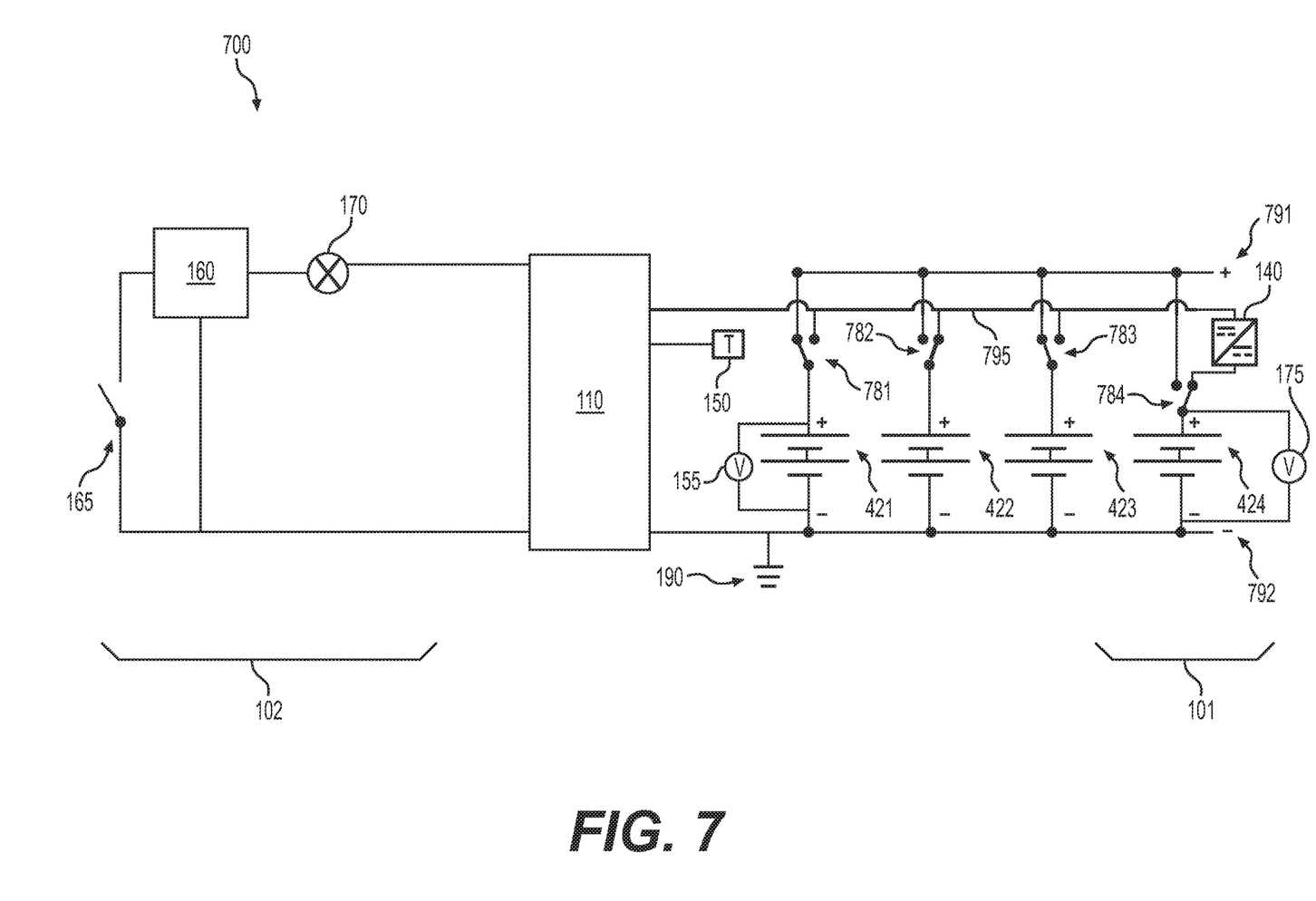
FIG. 7 is a circuit diagram showing another embodiment of an internal battery heating system.

FIG. 7 is a circuit diagram showing an exemplary internal battery heating system 700. System 700 is similar to system 600, FIG. 6 with additional electrical couplings to a first power terminal 791 and a second power terminal 792 configured for providing electrical power. A first switch 781, a second switch 782, a third switch 783, and a fourth switch 784 are each configured to switch a respective one of first, second, third, and fourth battery modules 421-424 between a heating circuit connection 795 for heating battery modules and first power terminal 791 for providing electrical power. In other words, first, second, third, and fourth switches 781-784 enable the drawing of electrical current from one or more battery modules while simultaneously heating any remaining modules that are not in use. In certain embodiments, first, second, and third switches 781-783 may alternatively be commanded by controller 110 to positions such that the respective battery module is neither heating nor providing electrical power but is instead idle.

As depicted in FIG. 7, second battery module 422 and fourth battery module 424 are coupled to heating circuit connection 795 via second and fourth switches 782, 784, respectively; and, first and third modules 421, 423 are coupled to power terminal 791 via first and third switches 781, 783, respectively. Each of the battery modules 421-424 may include a voltage sensor and a temperature sensor. One or more of first, second, and third modules 421, 422, 423 may be charged/discharged by raising/lowering the voltage from fourth module 424 via DC-DC converter 140 and coordinated switching of switches 781-784 based partially on voltages from the voltage sensors and temperatures from the temperature sensors under control of controller 110.

Combinations of features from the above embodiments may be formed to provide additional embodiments (not shown) without departing from the scope hereof. For example, systems 400, 500, and 700 (FIGS. 4, 5, and 7, respectively) may be supplemented with electrochemical sub-cells 231-233 (FIGS. 2 and 3). When preheating is inactive, sub-cells 231-233 may be integrated with first, second, third and fourth modules 421-424 to perform the same function. Exemplary sub-cells may be configured to be 7.2V 10 Ah (1 module) of a 7.2V 40 Ah (4 module) core battery. Such a combination may alternatively be configured with one module (or bank) serving as a sub-cell within a core battery having a plurality of modules. When preheating is active, module 424, FIG. 4 may be isolated from the remaining modules through an additional combination of switching devices. Additionally, each of the four modules may be selectively switched to function as a preheating sub-cell coupled to the DC-DC converter 140.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed in the various figures need be carried out in the specific order described.

What is claimed is:

1. An internal battery heating system, comprising:
a heating circuit comprising:
a plurality of battery modules electrically arranged in a parallel arrangement, wherein the plurality of battery modules comprises a first battery module and at least two additional battery modules;
a single electrical conversion device switchably connected to the first battery module and the parallel arrangement via a first switch; and
a plurality of additional switches, each additional switch switchably connected to a respective one of the at least two additional battery modules;
a controller electrically and communicatively coupled with the heating circuit, wherein the controller is adapted to instruct the single electrical conversion device to alternately raise and lower a voltage from the first battery module; and
the controller is adapted to command the first switch and the plurality of additional switches for selectively preheating at least one of the at least two of additional battery modules.

2. The internal battery heating system of claim 1, wherein the single electrical conversion device is a buck-boost DC-DC converter.

3. The internal battery heating system of claim 1, further comprising a plurality of temperature sensors and a plurality of voltage sensors communicatively coupled with the controller for monitoring temperature and voltage of the plurality of battery modules, respectively, wherein the controller is adapted to command coordinated switching of the first switch and the plurality of additional switches based on temperatures and voltages of the plurality of battery modules.

4. The internal battery heating system of claim 1, further comprising an indicator configured to indicate when each of the plurality of additional battery modules has been heated to a predetermined temperature.

5. The internal battery heating system of claim 1, further comprising an electrical power terminal, wherein each of the plurality of additional switches switchably connects a respective one of the at least two additional battery modules with the electrical power terminal such that each of the at least two additional battery modules is independently heated or independently coupled to the electrical power terminal for providing electrical power.

6. The internal battery heating system of claim 1, further comprising a control circuit, the control circuit comprising:
   a timer configured for activating the internal battery heating system for a duration;
   an enable switch that enables a user to activate the internal battery heating system; and
   an indicator that provides an indication when the internal battery heating system is active.

7. The internal battery heating system of claim 1, wherein the first battery module comprises a core battery powering certain components of an aircraft.

8. The internal battery heating system of claim 1, wherein the first battery module and the at least two additional battery modules comprise a ground power cart for an aircraft.

9. An internal battery heating system, the system comprising:
   a heating circuit comprising:
      a buck-boost DC-DC converter switchably connected to a first battery module via a first switch;
      a second battery module switchably connected to the first battery module via a second switch; and
      a third battery module switchably connected to the first battery module via a third switch,
      wherein the first battery module, the second battery module, and the third battery module are in a parallel arrangement; and
   a controller electrically and communicatively coupled with the heating circuit,
   wherein the controller is adapted to instruct the buck-boost DC-DC converter to alternately raise and lower a voltage from the first battery module,
   wherein the controller is adapted to command the second switch for selectively preheating the second battery module, and
   wherein the controller is adapted to command the third switch for selectively preheating the third battery module.

10. The internal battery heating system of claim 9, further comprising one or more additionally battery modules, wherein each additional battery module is switchably connected to the first battery module via a respective additional switch.

11. The internal battery heating system of claim 9, further comprising a plurality of temperature sensors and a plurality of voltage sensors communicatively coupled with the controller for monitoring temperature and voltage of the first battery module, the second battery module, and the third battery module, respectively, wherein the controller is adapted to command coordinated switching of the first switch, the second switch, and the third switch based on temperatures and voltages of the first battery module, the second battery module, and the third battery module.

12. The internal battery heating system of claim 9, further comprising an indicator configured to indicate when one of the second battery module or the third battery module has been heated to a predetermined temperature.

13. The internal battery heating system of claim 9, further comprising a control circuit, the control circuit comprising:
   a timer configured for activating the internal battery heating system for a duration;
   an enable switch that enables a user to activate the internal battery heating system; and
   an indicator that provides an indication when the internal battery heating system is active.

14. The internal battery heating system of claim 9, wherein the first battery module comprises a core battery powering certain components of an aircraft.

15. The internal battery heating system of claim 9, wherein the first battery module, the second battery module, and the third battery module comprise a ground power cart for an aircraft.

16. The internal battery heating system of claim 15, further comprising a heater-timer-enable switch for activating the internal battery heating system.

17. The internal battery heating system of claim 16, wherein the heater-timer-enable switch comprises a networked remote access switch.

18. An internal battery heating system, comprising:
   a plurality of battery modules arranged in a parallel arrangement,
      wherein the plurality of battery modules comprises a core battery module and at least two additional battery modules;
   a plurality of switches each switchably connecting a respective battery module of the plurality of battery modules to the parallel arrangement,
      wherein the plurality of switches comprises a core switch switchably connecting the core battery module to the parallel arrangement;
   a buck-boost DC-DC converter switchably connected to the parallel arrangement and the core battery module via the core switch; and
   a controller electrically and communicatively coupled with the plurality of switches and the buck-boost DC-DC converter,
      wherein the controller is adapted to command the core switch to connect the buck-boost DC-DC converter to the parallel arrangement and the core battery module,
      wherein the controller is adapted to instruct the buck-boost DC-DC converter to alternately raise and lower a voltage from the core battery module, and
      wherein the controller is adapted to command the plurality of switches, independent from the core switch, for selectively preheating one or more batteries modules of the plurality of battery modules.

19. The internal battery heating system of claim 18, further comprising a plurality of temperature sensors and a plurality of voltage sensors communicatively coupled with the controller for monitoring temperature and voltage of the plurality of battery modules, respectively, wherein the controller is adapted to command coordinated switching of the plurality of switches based on temperatures and voltages of the plurality of battery modules.

20. The internal battery heating system of claim 19, further comprising a control circuit, the control circuit comprising:
   a timer configured for activating the internal battery heating system for a duration;
   an enable switch that enables a user to activate the internal battery heating system; and an indicator that provides an indication when the internal battery heating system is active.

* * * * *